Figure 1:
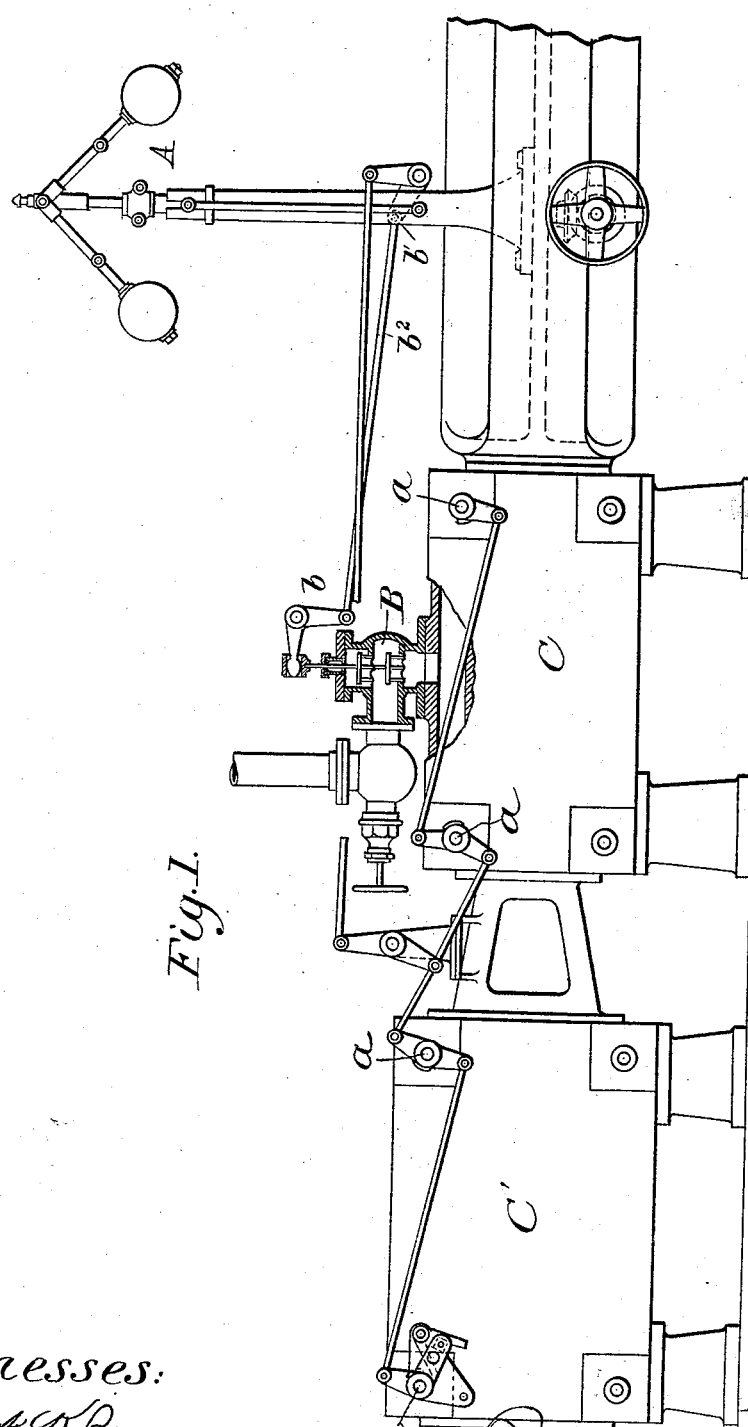

(No Model.) 3 Sheets—Sheet 1.

J. B. STANWOOD.
VALVE GEAR FOR STEAM ENGINES.

No. 552,152. Patented Dec. 31, 1895.

Witnesses:
Frank K. Burman
B. R. Thrasher

Inventor:
James B. Stanwood
by L. M. Hosea atty.

(No Model.) 3 Sheets—Sheet 2.
J. B. STANWOOD.
VALVE GEAR FOR STEAM ENGINES.
No. 552,152. Patented Dec. 31, 1895.
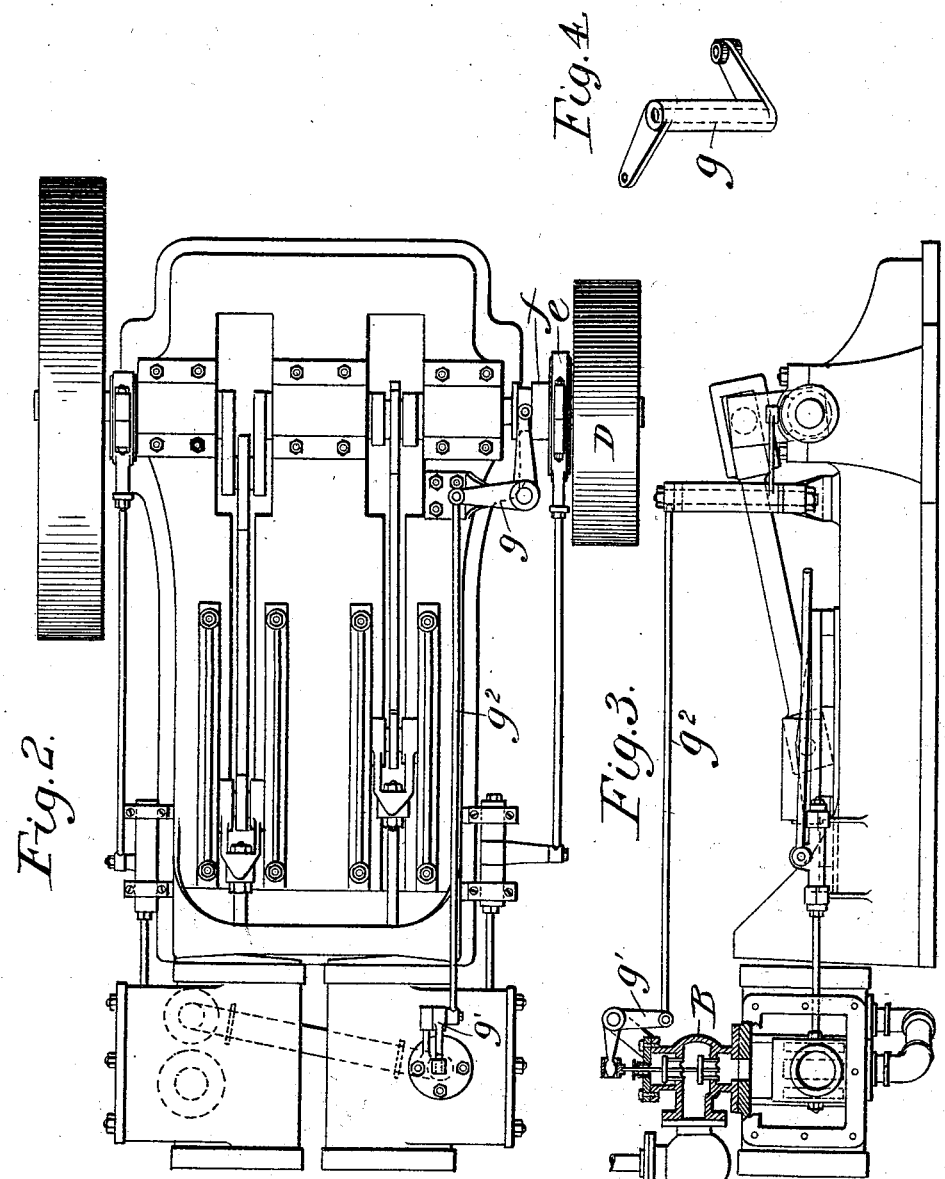

(No Model.) 3 Sheets—Sheet 3.
J. B. STANWOOD.
VALVE GEAR FOR STEAM ENGINES.
No. 552,152. Patented Dec. 31, 1895.
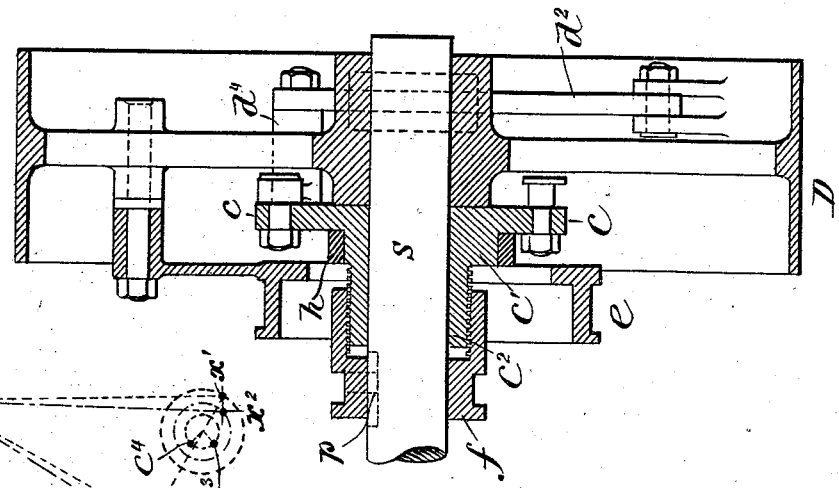
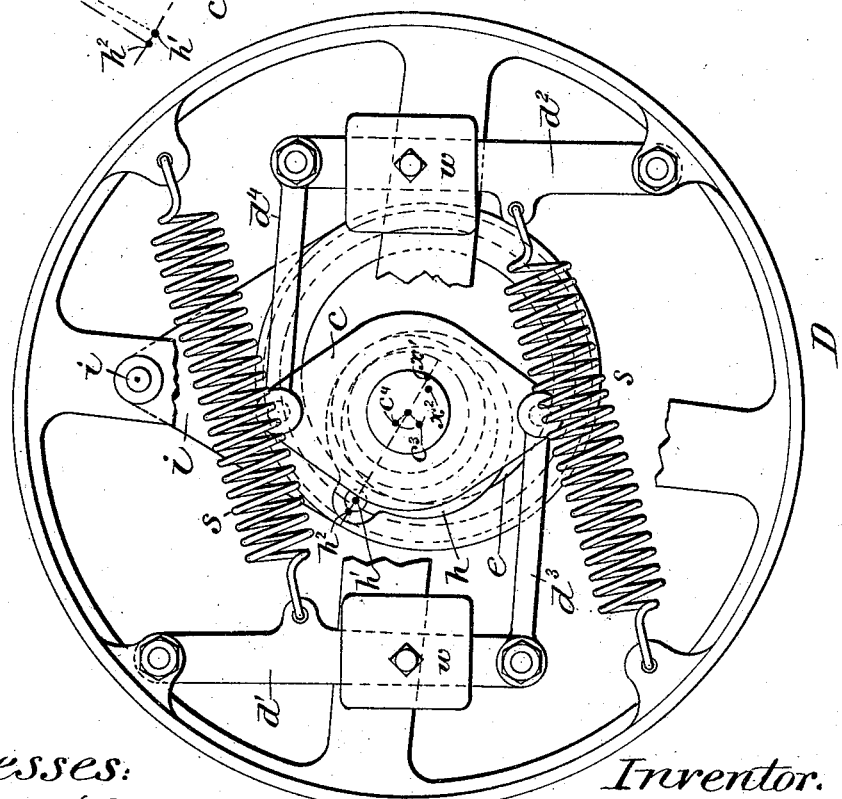
Witnesses: Inventor.

UNITED STATES PATENT OFFICE.

JAMES B. STANWOOD, OF CINCINNATI, OHIO.

VALVE-GEAR FOR STEAM-ENGINES.

SPECIFICATION forming part of Letters Patent No. 552,152, dated December 31, 1895.

Application filed November 10, 1894. Serial No. 528,390. (No model.)

*To all whom it may concern:*

Be it known that I, JAMES B. STANWOOD, a citizen of the United States, residing at Cincinnati, Ohio, have invented new and useful Improvements in Valve-Gear Steam-Engines, of which the following is a specification.

My invention relates to improvements in the steam-engine, its object being to obtain a better regulation of its action in the varying conditions of its use in actual service in the industrial arts and a more economical use of the steam-power employed; to which end it consists in the combination, with the engine, of means whereby the regulation of speed, the adjustment of steam-pressure, and the degree of expansion behind the working piston are automatically controlled by one and the same moving element—the engine-governor.

Heretofore the speed of the engine has been controlled in one of two modes, namely: First, by a regulating-valve in the steam-supply pipe actuated by a governor, the expansion being determined by the fixed proportions of parts or by mechanism under control of the governor which admits steam to the cylinder at, or approximately at, boiler-pressure and automatically cuts off the supply at such period of the piston-stroke as to maintain a nearly constant speed for light and heavy loads. Experience proves, however, that for a cylinder of given proportions there is a narrow range of cut-off points, or corresponding ratios of expansion, which gives or permits a maximum economical result in the proportion of steam used to work done. Any earlier or later cut-offs (or larger or smaller ratios of expansion) increases the amount of steam used per horse-power delivered.

The severe demands made upon steam-engines employed to drive electrical plants, &c., which require instantaneous adjustments of power to widely-varying conditions of load, make it extremely desirable to have the steam economy as high as possible for these extreme conditions of load. To meet this demand I have devised a method of automatically controlling both the pressure of steam delivered to the engine and the determination of the point of cut-off by the same means used to regulate the speed of the engine, so that the range of cut-off, or the corresponding ratios of expansion, may be kept within economical limits under great variations of load.

The invention is especially advantageous as applied to compound or multicylinder expansion engines, inasmuch as early cut-offs in the primary cylinder of the series frequently cause so great a number of expansions as to render the operation of the engine not only wasteful but, with some forms of valve-motion, impracticable. By automatically reducing the initial steam-pressure the stresses upon the engine working under light loads are greatly reduced; and this corresponds to the practice of many engineers, who, under similar conditions, reduce the initial pressure by manipulating the throttle-valve of the supply-pipe. On the other hand, by automatically delaying the cut-off, reducing the ratio of expansion, heavier loads can be carried than under a fixed cut-off, thus increasing the range of power.

In connection with the forms of valve-gear of the Corliss type the utilization of the speed-governor to control both cut-off and supply-regulation tends, moreover, to prevent excessive speed through failure of either of the operating mechanisms singly.

My invention is illustrated in the accompanying drawings, in which—

Figure 1 is a partial side elevation of a tandem compound engine of the Corliss type, showing my invention applied thereto in connection with the ball-governor. Fig. 2 is a plan and corresponding elevation of a parallel-cylinder compound engine, showing the application of my invention thereto in connection with the shaft-governor. Fig. 3 is an enlarged elevation and axial cross-section of a shaft-governor, showing details of construction and adaptation of my invention thereto. Fig. 4 is a detail view of the bell-crank *g* detached. Fig. 5 is a side elevation, and Fig. 6 an axial cross-section, of a shaft-governor to which my invention is applied; and Fig. 7 is a diagram showing the relative arcs of movement of the governor and eccentrics.

Referring now to the drawings herewith, illustrating the application of the invention to two different types of engines, namely: first, those in which the governor acts directly upon the admission-valve to control the cut-off, and, second, those in which the governor acts upon the eccentric or valve-mover.

In the first-mentioned type (shown in Fig. 1) the governor A is connected to the admission-valve gear $a\ a\ a\ a$ (which is of the usual construction and requires no formal description) to control the point of cut-off in the working cylinders C C'. In this type of engines I add a regulating-valve B, which, for this purpose, is so constructed as to be delicately balanced in the supply-pipe adjacent to the primary cylinder C and connect it, as by bell-cranks $b\ b'$ and connecting-rod $b^2$, to the governor A in such manner that with light loads the earliest practicable cut-off is determined by the governor and the steam-admission aperture is also correspondingly reduced. The regulation and setting of these connections will of course depend upon the nature of the service to which the engine is devoted, but it will be seen that by a setting of the devices which permits maximum boiler-pressure in the primary cylinder in case of heavier loads and a reduction of initial pressure for the lighter loads the range of working variations can be constrained to fall constantly within the best limits of expansion and greater economy will result.

In the type of engines illustrated in Figs. 2 and 3, where the eccentric $e$ is controlled, either as to its amount of eccentricity or its radial position upon the shaft by a governor, the regulating-valve B is connected mediately to the governor by a grooved collar $f$, carried loosely upon the shaft and threaded on the extended hub $c^2$ of the intermediate oscillating plate $c$, forming part of the connection between the governor D and the eccentric or valve-mover $e$, Fig. 6. A convenient construction of the connecting mechanism to the regulating-valve is shown in Figs. 2, 3, and 4 in the bell-cranks $g\ g'$, carried upon suitable fixed brackets connected by a connecting-rod $g^2$. The collar $f$ has a slot-and-feather connection with the shaft S, as indicated by dotted lines at $p$, Fig. 6, whereby it is held in fixed radial relations with the shaft and is moved longitudinally upon the shaft by the rotation of the hub $c^2$.

The construction and action of the governor in other respects is as follows: The main pulley D upon the shaft S carries pivoted near its periphery two arms $d'\ d^2$, connected by links $d^3\ d^4$, respectively, to opposite ends of an oscillating plate $c$, centered upon the shaft S and provided with a hub having an eccentric portion $c'$, and a further extension $c^2$, concentric with the shaft S, as described. A strap-link $h$ upon the eccentric $c'$ has a pivotal connection $h'$ with the main eccentric $e$, which is swung upon an arm or plate $i$, pivotally connected to the main pulley at $i'$. The arms $d'\ d^2$ are provided with adjustable weights $w$ and springs $s$ in the usual manner.

Referring now to the diagram, Fig. 7, it will be observed that the action of the governor oscillates the rotating plate $c$, which action moves the center $c'$ of the intermediate eccentric from $c^3$ to $c^4$. By this action the pivotal connection $h'$ of the strap $h$ is moved to $h^2$ and shifts the center $x'$ of the main eccentric to $x^2$, an angular arc equal to $h'\ h^2$. At the same time the rotation of the oscillating plate $c$ with its eccentric $h$, through the arc $c^3\ c^4$, rotates the hub $c^2$, which shifts longitudinally the collar $f$ and operates the valve B through connections $g\ g'\ g^2$. The relation of these movements, it will be observed, is substantially the same as the relation of the movements of the crank-pins of the connections before described, and produces a like result, namely: that in heavy loads, where the tendency of the engine is to slow speed, the cut-off practically governs, whereas in light loads, where the tendency is toward high speed, the regulating-throttle governs.

It will be observed from the relative setting of the bell-crank connections of the governor in Fig. 1 that the immediate effect of the governor is primarily on the distributing-valve connections $a$, at which relative period the action of the governor upon the valve B is very slight. The two cranks are set in such relations that as the governor increases its speed the range of controlling action upon the cut-off valves diminishes, while the range of controlling action upon the regulating-valve B increases. It thus follows that the controlling action of the governor upon these two is, in a degree, successive—the regulating-valve being in the first part of the governor movement practically wide open and exercising no control upon the movement of the engine, whereas in the higher range of speed of the governor it exercises a direct control. Thus in light loads upon the engine, where speed increases, the regulating-valve controls, while in heavy loads, where speed becomes reduced, the cut-off is lengthened and thus controls the engine.

I claim as my invention and desire to secure by Letters Patent of the United States—

1. In a steam-engine, the combination of a variable cut-off mechanism and a regulating admission valve, with one and the same moving element or governor, in such relations that with increased loads, where the tendency is to reduce speed, the cut-off mechanism is actuated to delay the point of cut off (thus increasing the period of steam-admission) and, with diminished load where the tendency is to a higher speed, to shorten the steam admission period and the admission valve is actuated to reduce the steam supply, substantially as set forth.

2. The combination, in a steam engine, with the main shaft and a centrifugal governor actuated thereby: of adjustable cut-off mechanism, and a regulating valve in the supply-passage, both connected to and operated simultaneously with and by the said governor substantially as set forth.

3. The combination, in a steam-engine, of an adjustable cut off mechanism and a regulating valve in the steam-supply passage, both connected to and controlled by a centrifugal governor, and an intermediate rotating connecting device between the governor and the adjustable cut off mechanism, and between the governor and the regulating valve in the steam supply passage, so connected to both as to automatically adjust the degree of their operation, whereby the cut-off is delayed under high initial pressure with heavy loads, and the cut off is shortened and initial pressure is reduced with light loads.

In testimony whereof I have hereunto set my hand in the presence of two subscribing witnesses.

JAMES B. STANWOOD.

Witnesses:
L. M. HOSEA,
THOMAS M. CHUCK.